(12) United States Patent
Canankamp et al.

(10) Patent No.: US 7,337,816 B2
(45) Date of Patent: Mar. 4, 2008

(54) TIRE TREAD WITH CIRCUMFERENTIAL AND LATERAL GROOVES HAVING ASYMMETRICAL CROSS-SECTION

(75) Inventors: Mark Anthony Canankamp, Akron, OH (US); Graham Alexander Carney, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 11/066,523

(22) Filed: Feb. 25, 2005

(65) Prior Publication Data

US 2006/0191616 A1 Aug. 31, 2006

(51) Int. Cl.
  *B60C 11/11* (2006.01)
  *B60C 11/13* (2006.01)
(52) U.S. Cl. .................. 152/209.24; 152/902
(58) Field of Classification Search ............ 152/209.2, 152/209.18, 209.23, 209.24, 209.26, 209.28, 152/902
See application file for complete search history.

(56) References Cited

U.S. PATENT DOCUMENTS

| | | | | |
|---|---|---|---|---|
| 1,078,098 A * | 11/1913 | Kremer | ................ | 152/209.28 |
| 3,768,535 A * | 10/1973 | Holden | ................ | 152/209.24 |
| 4,284,115 A | 8/1981 | Ohnishi | ................ | 152/209 R |
| 4,299,264 A | 11/1981 | Williams | ................ | 152/209 R |
| 4,446,901 A * | 5/1984 | Endo et al. | ............ | 152/209.24 |
| 4,840,211 A | 6/1989 | Makino | ................ | 152/209 R |
| 5,044,414 A | 9/1991 | Ushikubo | ............ | 152/209 R |
| 5,363,895 A * | 11/1994 | Wells et al. | ............ | 152/209.2 |
| 5,435,365 A * | 7/1995 | Tanaka | ................ | 152/209.26 |
| 5,450,885 A * | 9/1995 | Hanya | ................ | 152/209.26 |
| 5,526,858 A | 6/1996 | Ikeda | ................ | 152/209 B |
| 5,529,101 A | 6/1996 | Croyle et al. | ........... | 152/209 R |
| 5,769,977 A * | 6/1998 | Masaoka | ............ | 152/209.28 |
| 6,079,464 A | 6/2000 | Hatakenaka et al. | ... | 152/209.24 |
| 6,405,772 B1 * | 6/2002 | Suzuki et al. | .......... | 152/209.15 |
| 6,412,532 B1 * | 7/2002 | Iida et al. | ................ | 152/209.5 |
| 6,640,858 B2 | 11/2003 | Ikeda | ................ | 152/209.15 |
| 2002/0092591 A1 * | 7/2002 | Cortes | ................ | 152/209.18 |
| 2005/0039835 A1 * | 2/2005 | Yamane | ................ | 152/209.24 |
| 2006/0011280 A1 * | 1/2006 | Yagita | ................ | 152/209.24 |

FOREIGN PATENT DOCUMENTS

| | | | |
|---|---|---|---|
| JP | 50-98002 | * | 8/1975 |
| JP | 58-177703 | * | 10/1983 |
| JP | 02-141310 | * | 5/1990 |
| JP | 9-156321 | * | 6/1997 |

* cited by examiner

*Primary Examiner*—Steven D. Maki
(74) *Attorney, Agent, or Firm*—Richard B. O'Planick; Nancy T. Krawczyk

(57) ABSTRACT

A pneumatic tire for dirt track racing comprising lateral and circumferential grooves forming blocks on the tread surface. The blocks have leading and trailing edge walls. The trailing edge walls of the blocks are buttressed by inclining the walls at an angle of 20°-60° relative to a line perpendicular to a tangent to the tread, and the edge wall extends into the groove by a distance of approximately one-half the tread width. The leading edge walls of the blocks have a radially outer portion inclined at about zero degrees and a radially inner portion have a radius of curvature of infinity or less, wherein the intersection point between the two portions is at about one-half the groove depth.

10 Claims, 2 Drawing Sheets

TIRE TREAD WITH CIRCUMFERENTIAL AND LATERAL GROOVES HAVING ASYMMETRICAL CROSS-SECTION

FIELD OF THE INVENTION

The present invention is directed to a pneumatic tire. More specifically, the invention is directed to a tire tread pattern having grooves of a particular configuration.

BACKGROUND OF THE INVENTION

In sprint car racing, much of the races are run on dirt tracks. The tires used in sprint car racing have very simple tread configurations, characterized by straight circumferential and transverse grooves forming square and rectangular block patterns.

Because of the track material, the tire treads are formed from a rubber compound that is softer than what is conventionally used for a passenger vehicle tire. The durometer of a sprint car tire is generally below 50. However, the softness of the tread, combined with the block-like tread configuration, creates a non-uniform tread wear pattern. The trailing edge 100 of the blocks is pushed into the adjacent grooves 102, see FIG. 5, creating an area of the block that does not contact the ground and is thus not worn away. The result is a tread block having a lip 104 of unworn material, see FIG. 6, further exacerbating the uneven wear problem. Also, the softer the compound forming the tread, the greater the problem of uneven wear.

SUMMARY OF THE INVENTION

The present invention is directed to a tire having a tread configuration resulting in improved uniform wear of the tread. The tread of the invention also results in a tire having greater ground contact, and thus improved traction. Also, the tread has improved water and air evacuation from the grooves.

To achieve the desired goals, disclosed is a tire tread for a pneumatic tire. The tread has a first tread edge and a second tread edge, and a plurality of lateral grooves. The lateral grooves have first and second opposing groove walls, the groove walls having inclination angles relative to a line perpendicular to a tangent to the tread surface. The first groove wall has an inclination angle $\beta$ in the range of 0°-2° in a radially outer portion of the groove wall while the radially inner portion of the groove wall has a radius of curvature. The intersection point between the radially outer portion and the radially inner portion of the groove wall is at a height of 40-60% of the groove depth, as measured from the groove bottom.

In another aspect of the tire tread, the second, opposing groove wall is buttressed such that the second groove wall has an inclination angle $\alpha$ in the range of 20°-60°. Preferably, the second groove wall extends into the groove by a distance $W_T$ of 45-55% of the groove width W.

In another aspect of the tire tread, the tread is formed of a rubber having a durometer hardness in the range of 15 to 45.

In another aspect of the invention, the tread also has circumferential grooves extending generally parallel to the tread edges. The circumferential grooves have first and second opposing groove walls, the first groove walls being located closer to the first tread edge than the second groove wall. The groove wall has inclination angles relative to a line perpendicular to a tangent to the tread surface. Similar to the lateral grooves, the first groove wall has an inclination angle $\beta$ in the range of 0°-2° in a radially outer portion of the groove wall while the radially inner portion of the groove wall has a radius of curvature. The intersection point between the radially outer portion and the radially inner portion of the groove wall is at a height of 40-60% of the groove depth, as measured from the groove bottom.

In another aspect of the invention, the second groove wall of the circumferential groove has an inclination angle $\alpha$ in the range of 20°-60°, and may extend into the groove by a distance $W_T$ of 45-55% of the groove width W.

Also disclosed is a pneumatic tire having a plurality of lateral grooves. The lateral grooves have opposing groove walls comprising a leading groove wall and a trailing groove wall, the groove walls having inclination angles relative to a line perpendicular to a tangent to the tread surface. The trailing groove wall of the lateral grooves have an inclination angle $\alpha$, the inclination angle $\alpha$ being in the range of 20°-60° and the groove wall extends into the groove by a distance $W_T$ of 45-55% of the groove width W.

In another aspect of this invention, the leading groove wall of the lateral grooves has an inclination angle $\beta$ in the range of 0°-2°. Preferably, the leading edge walls have an upper radial portion and a lower radial portion. When formed with two portions, the upper radial portion is defined by the inclination angle $\beta$ and the lower radial portion is defined by a radius. The radius value is equal to infinity or less.

Also disclosed is a pneumatic tire comprising a tread located on the radially outer side of the tire for making contact with a ground surface. The tire has a preferred direction of orientation for forward movement, and comprises a plurality of circumferential grooves and lateral grooves, the grooves forming a plurality of tread blocks. Due to the preferred direction of forward rotation of the tire, the tread blocks have a transverse leading edge wall and a transverse trailing edge wall, the transverse leading and trailing edges walls of each block being formed by the transverse grooves and the tread blocks have a circumferential leading edge wall and a circumferential trailing edge wall, the circumferential leading and trailing edge wall of each block being formed by the circumferential grooves.

In the tread, the transverse and circumferential leading edge walls of the block have an inclination angle relative to a line perpendicular to the tire radial direction, the inclination angle $\beta$ being in the range of 0°-2° while the transverse and circumferential trailing edge walls of the block have an inclination angle $\alpha$ relative to a line perpendicular to the tire radial direction, the inclination angle being in the range of 20°-60°.

In one aspect of this invention, the transverse and circumferential leading edge walls have an upper radial portion and a lower radial portion, wherein the upper radial portion is defined by the inclination angle $\beta$ and the lower radial portion is defined by a radius. Preferably, the intersection point between upper and lower radial portions is located at a height equivalent to 40 to 60% of the groove depth D.

In another aspect of the invention, the transverse and circumferential trailing edge walls of the block extend into the groove to a distance $W_T$ of 45-55% of the groove width W.

In another aspect of the invention, the tread is formed of a rubber having a durometer hardness in the range of 15 to 45.

Definitions

The following definitions are controlling for the disclosed invention.

"Axial" and "axially" are used herein to refer to lines or directions that are parallel to the axis of rotation of the tire.

"Circumferential" means lines or directions extending along the perimeter of the surface of the annular tire parallel to the Equatorial Plane (EP) and perpendicular to the axial direction.

"Equatorial plane (EP)" means the plane perpendicular to the tire's axis of rotation and passing through the center of its tread.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "slot". A "slot" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length.

"Lateral" means an axial direction.

BRIEF DESCRIPTION OF THE DRAWINGS

The invention will be described by way of example and with reference to the accompanying drawings in which.

DETAILED DESCRIPTION OF THE INVENTION

Figure 1:
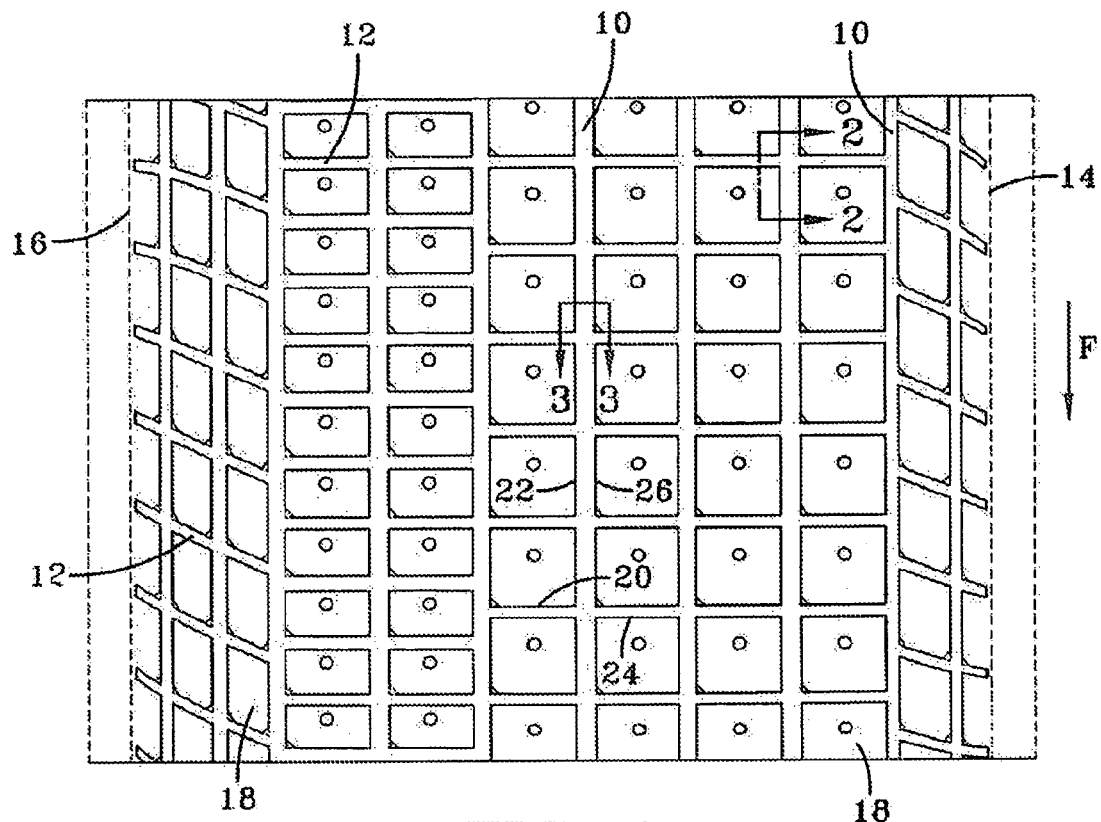
FIG. 1 is a tire tread.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures may use the same reference numeral for similar components. The structures employed basically the same components with variations in location or quantity thereby giving rise to the alternative constructions in which the inventive concept can be practiced.

FIG. 1 is a tire tread for a pneumatic tire intended to be used in sprint car dirt track racing. The tread is formed of a rubber having a durometer hardness of 20-65. Preferably, the tread is formed of a rubber having a durometer hardness of 15-45. The tread configuration has a plurality of circumferential grooves 10 and a plurality of lateral grooves 12. The illustrated tread has ten circumferential grooves 10. The lateral grooves 12 are not continuous from one tread edge 14 to the opposing tread edge 16, though the lateral grooves 12 have a centerline that is inclined at 90° relative to the tread edges for the majority of the groove length. Throughout the tread, all of the grooves 10, 12 are opposing first and second groove walls, see FIGS. 2 and 3.

The circumferential grooves 10 and lateral grooves 12 form a plurality of tread blocks 18. The blocks 18 generally have a tetragon configuration. Depending on the spacing between the circumferential and lateral grooves 10, 12, the blocks 18 have a square, rectangular, or parallelogram configuration. When the tread is on a tire, the tire is mounted with a preferred forward rotation, as shown by arrow F, thus giving the blocks leading and trailing edge walls. When taken in the context of dirt track racing, wherein the vehicle is predominately driven in a forward direction and travels predominately in circles, the block 18 has a lateral leading edge wall 20, a lateral trailing edge wall 24, a circumferential trailing edge wall 22, and a circumferential leading edge wall 26. Additionally, block walls 22 and 26 are also opposing groove walls of the circumferential grooves while block walls 20 and 24 are also opposing groove walls of the lateral grooves.

Figures 2, 3:
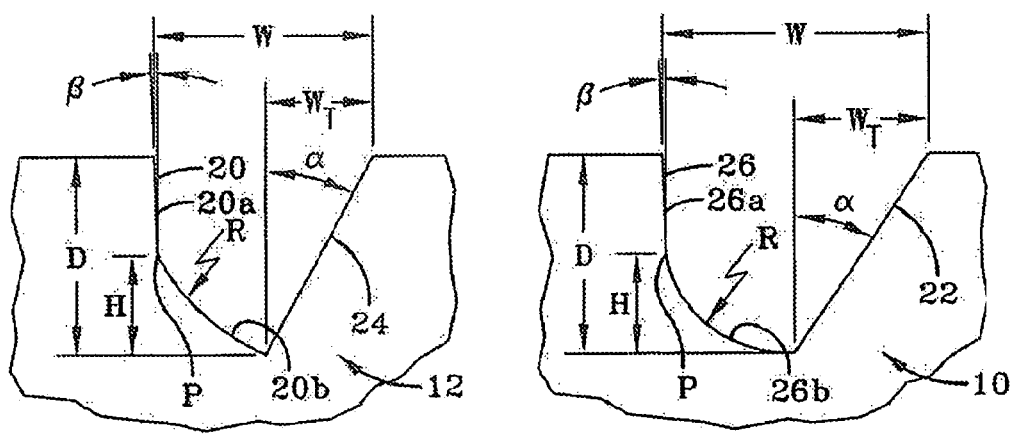
FIG. 2 is a cross section of a groove along line 2-2 in FIG. 1.
FIG. 3 is a cross section of a groove along line 3-3 in FIG. 1.

The lateral groove 12 is illustrated more fully in FIG. 2. The groove 12 has opposing groove walls 20, 24. The first groove wall 20 is also the lateral leading edge wall of the block 18. As the tire rotates in the preferred forward rotation, this groove wall and block edge wall contacts the ground first. The first groove wall 20 has a radially outer portion 20*a* and a radially inner portion 20*b*. The radially outer portion 20*a* is defined by a planar configuration, inclined at an angle β of 0° to 2° relative to a line perpendicular to a tangent to the tread surface. The radially inner portion 20*b* is defined by a radius of curvature R of infinity (i.e. a flat surface) or less (i.e. a curved surface), preferably less than infinity. The radially outer portion 20*a* and the radially inner portion 20*b* of the groove wall 20 connect at an intersection point P wherein the intersection point P is located at a height H equivalent to 40 to 60% of the groove depth D, as measured from the bottom of the groove 12.

The second groove wall 24 of the lateral groove 12, which is also the lateral trailing edge wall of the block 18, is defined by a single inclined plane, inclined at an angle α of 20°-60° relative to the line perpendicular to a tangent to the tread surface. Additionally, the groove wall 24 extends into the groove by a distance $W_T$ of groove width W. The distance $W_T$ is equal to 45 to 55% of the groove width W, preferably 50% of the groove width W.

Figure 4:
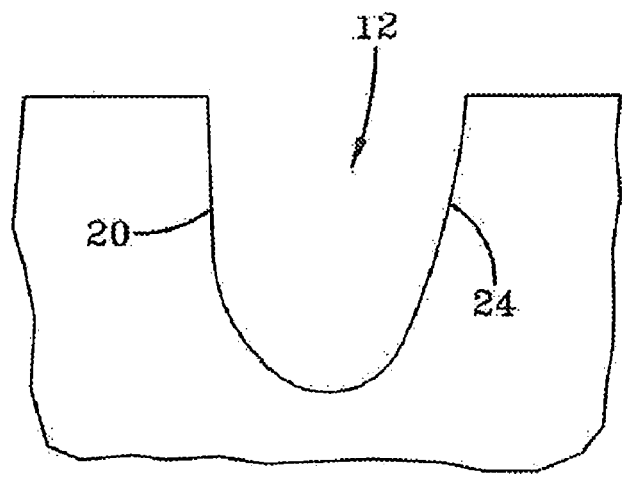
FIG. 4 is a cross section of a groove under pressure.
Figure 5:
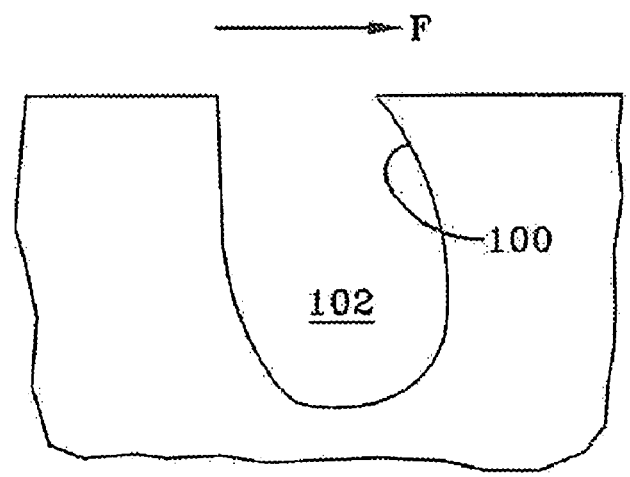
FIG. 5 is a cross section of a prior art groove under pressure.
Figure 6:
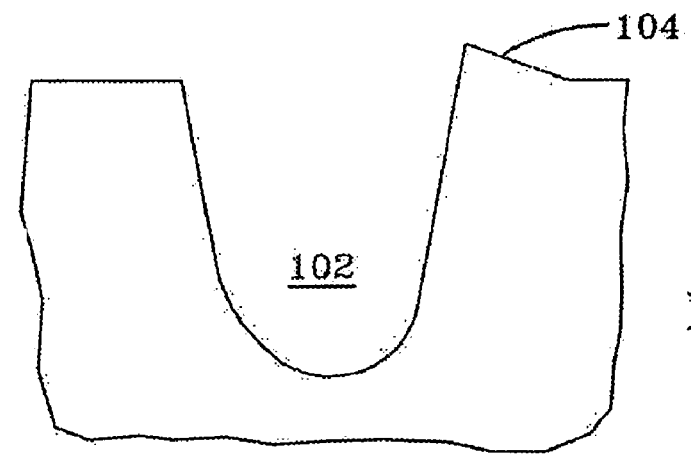
FIG. 6 is a cross section of a prior art groove after being worn.

By forming the second groove wall/trailing edge wall at the incline of 20° to 60°, the trailing wall of the block 18 is always buttressed. Due to the buttressing, when the tread is rotating, the pushing of the block 18 into the trailing groove wall is reduced, and during rotation and under pressure, the groove wall 24 has a more vertical stance, see FIG. 4, as compared to the leaning stance of the prior art groove walls, see FIG. 5.

Also, when the trailing edge wall 24 has an extent of approximately half the groove width W, as the inclination angle α increases, the groove width W increases. This maximizes the net-to-gross ratio of the tread, and ensures that the groove stays open during contact with the ground.

To achieve the maximum desired benefit of improved wear and water discharge of the tread, the circumferential groove is formed in a similar manner to the lateral groove.

The circumferential groove 10 is illustrated more fully in FIG. 3. The groove 10 has opposing groove walls 22, 26. The first groove wall 26, which is also the circumferential leading wall of the block 18, has a radially outer portion 26*a* and a radially inner portion 26*b*. The radially outer portion 26*a* is defined by a planar configuration, inclined at an angle β of 0° to 2° relative to a line perpendicular to a tangent to the tread surface. The radially inner portion 26*b* is defined by radius of curvature R of infinity (i.e. a flat surface) or less (i.e. a curved surface), preferably less than infinity. The radially outer portion 26*a* and the radially inner portion 26*b* of the groove wall 26 connect at an intersection point P wherein the intersection point P is located at a height H equivalent to 40 to 60% of the groove depth D, as measured from the bottom of the groove 10.

The second groove wall 22 of the circumferential groove 10, which is also the circumferential trailing edge wall of the block 18, is defined by a single inclined plane α, inclined at an angle of 20°-60° relative to the line perpendicular to a tangent to the tread surface. Additionally, the groove wall 22 extends into the groove by a distance $W_T$ of groove width W. The distance $W_T$ is equal to 45 to 55% of the groove width W, preferably 50% of the groove width W.

The tread may be formed integrally with a tire, or prepared as a tread strip and applied separately to a previously cured tire carcass. Also, the exact tread configuration is not limited to the exact configuration shown in FIG. 1. The disclosed groove and block wall teachings may be employed with any predominately block tread configuration, and especially any dirt track tread configuration.

What is claimed is:

1. A tire tread for a pneumatic tire, the tread comprising a first tread edge and a second tread edge, a plurality of lateral grooves, wherein the lateral grooves have first and second opposing groove walls, the groove walls having inclination angles relative to a line perpendicular to a tangent to the tread surface, the tread being characterized by:
    the first groove wall having an inclination angle β in the range of 0°-2° in a radially outer portion of the groove wall and a radially inner portion of the groove wall has a radius of curvature of less than infinity, the intersection point between the radially outer portion and the radially inner portion of the groove wall being at a height of 40-60% of the groove depth, as measured from the groove bottom, and
    the second groove wall is inclined at an angle α in the range of 20°-60° from the groove bottom to the tread surface.

2. The tread of claim 1, wherein the inclined second groove wall extends into the groove by a distance $W_T$ of 45-55% of the groove width W.

3. The tread of claim 1, the tread further comprising circumferential grooves extending generally parallel to the tread edges, wherein the circumferential grooves have first and second opposing groove walls, the first groove walls being located closer to the first tread edge than the second groove wall, the groove walls having inclination angles relative to a line perpendicular to a tangent to the tread surface, wherein the first groove wall of the circumferential groove has an inclination angle β in the range of 0°-2° in a radially outer portion of the groove wall and a radially inner portion of the groove wall has a radius of curvature, the intersection point between the radially outer portion and the radially inner portion of the groove wall being at a height of 40-60% of the groove depth, as measured from the groove bottom.

4. The tread of claim 3 wherein the second groove wall of the circumferential groove has an inclination angle α in the range of 20°-60°.

5. The tread of claim 4, wherein the inclined second groove wall of the circumferential groove extends into the groove by a distance $W_T$ of 45-55% of the groove width W.

6. The tread of claim 3 wherein the radius of curvature of the radially inner portion of the first groove wall of the circumferential groove has a value less than infinity.

7. The tread of claim 1, wherein the tread is formed of a rubber having a durometer hardness in the range of 15 to 45.

8. A tire having a tread formed in accordance with claim 1.

9. A pneumatic tire, the tire comprising a tread located on the radially outer side of the tire for making contact with a ground surface, the tire having a preferred direction of orientation for forward movement, the tread comprising a plurality of circumferential grooves and lateral grooves, the grooves forming a plurality of tread blocks,
    wherein due to the preferred direction of forward rotation of the tire, the tread blocks have a transverse leading edge wall and a transverse trailing edge wall, the transverse leading and trailing edges walls of each block being formed by the transverse grooves, and the tread blocks have a circumferential leading edge wall and a circumferential trailing edge wall, the circumferential leading and trailing edge wall of each block being formed by the circumferential grooves,
    the tread being characterized by the transverse and circumferential leading edge walls of the block having an upper radial portion and a lower radial portion, the upper radial portion having an inclination angle relative to a line perpendicular to a tangent to the tread surface, the inclination angle β being in the range of 0°-2°, and the lower radial portion has a radius of curvature of less than infinity and
    the transverse and circumferential trailing edge walls of the block having an inclination angle α relative to a line perpendicular to a tangent to the tread surface from the tread surface to the groove bottom, the inclination angle α being in the range of 20°-60°;
    wherein the upper radial portion and the lower radial portion have an intersection point, the intersection point located at a height equivalent to 40 to 60% of the groove depth D.

10. A pneumatic tire, the tire comprising a tread located on the radially outer side of the tire for making contact with a ground surface, the tire having a preferred direction of orientation for forward movement, the tread comprising a plurality of circumferential grooves and lateral grooves, the grooves forming a plurality of tread blocks,
    wherein due to the preferred direction of forward rotation of the tire, the tread blocks have a transverse leading edge wall and a transverse trailing edge wall, the transverse leading and trailing edges walls of each block being formed by the transverse grooves, and the tread blocks have a circumferential leading edge wall and a circumferential trailing edge wall, the circumferential leading and trailing edge wall of each block being formed by the circumferential grooves, the tread being characterized by the transverse and circumferential leading edge walls of the block having an upper radial portion and a lower radial portion, the upper radial portion having an inclination angle relative to a line perpendicular to a tangent to the tread surface, the inclination angle β being in the range of 0°-2°, and the lower radial portion has a radius of curvature of less than infinity and the transverse and circumferential trailing edge walls of the block having an inclination angle α relative to a line perpendicular to a tangent to the tread surface from the tread surface to the groove bottom, the inclination angle α being in the range of 20°-60°;

wherein the transverse and circumferential trailing edge walls of the block extend into the groove to a distance $W_T$ of 45-55% of the groove width W.

* * * * *